Nov. 6, 1962    ESPERANZA PARRISH    3,062,702
                NEE GUANDIQUE ET AL
                FIBRID MIXTURE PRODUCTS
                   Filed Jan. 23, 1957
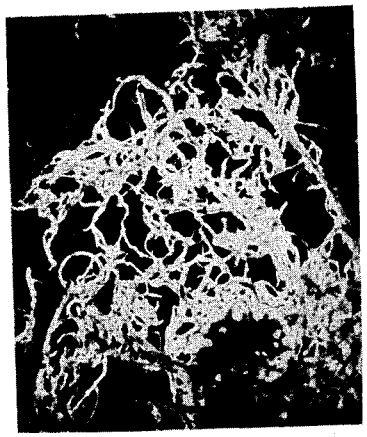
Inventors
ESPERANZA PARRISH
JOHN R. MC CARTNEY
By Carl A. Hechmer
Attorney

United States Patent Office 3,062,702
Patented Nov. 6, 1962

3,062,702
FIBRID MIXTURE PRODUCTS
Esperanza Parrish, nee Guandique, Wilmington, Del., and John R. McCartney, West Chester, Pa., assignors to E. I. du Pont de Nemours and Company, Wilmington, Del., a corporation of Delaware
Filed Jan. 23, 1957, Ser. No. 635,731
5 Claims. (Cl. 162—157)

This invention relates to a novel product and process. More specifically it relates to a novel and useful heterogeneous mass of particles of a "soft" soluble, synthetic polymer as described more in detail hereinafter which is particularly useful in the production of sheet-like structures and to a process for its production.

It is an object of the present invention to provide a novel composition of matter capable of forming sheet-like structures on a paper-making machine.

Another object is to provide a process for producing a heterogeneous mass of particles of a "soft" soluble synthetic polymer useful in the production of non-woven structures.

These and other objects will become apparent in the course of the following specification and claims.

STATEMENT OF INVENTION

In accordance with the present invention a novel product is provided comprising a heterogeneous mass of particles of a "soft" soluble synthetic polymer, the said particles in the same said heterogeneous mass having at least one dimension no greater than about 10 microns and of minor magnitude relative to its largest dimension, and the ribbon-like portions of the fibrous matter among the said particles being no greater than about 100 microns in width, and the fibrous matter being of varying diameter along its length, the said particles being non-rigid and small enough to pass through a 10-mesh screen yet large enough so that 90% is retained by a 200-mesh screen when deposited from an agitated dilute suspension, and being further characterized by a freeness number of between about 100 and 750 when in the form of an aqueous slurry, and a capacity to form a waterleaf having a wet strength tenacity of at least about 0.001 gram per denier. The heterogeneous mass of particles may conveniently be labeled "soft fibrids."

DEFINITION OF "SOFT SYNTHETIC POLYMER"

The term "synthetic polymer" as used herein, is intended to designate a polymeric material synthesized by man as distinguished from a polymeric product of nature or a derivative thereof. By a "soft" polymer is meant one having an initial modulus of less than about 0.9 gram per denier. Polymers having an initial modulus above this limit will be referred to as "hard."

SOFT FIBRID APPEARANCE

By having "at least one dimension of minor magnitude relative to the largest dimension" is meant that the fibrids of the present invention are non-granular in nature, i.e., they tend to have little thickness in relation to their length, as in a fiber, or to both length and width, as in a film or ribbon. The irregular outline of many of the fibrids becomes apparent upon consideration of photographs of microscopic views of their liquid suspensions. In any mass of fibrids, the dimension of the particles appears to vary gradually through the range defined by the upper and lower size limits. Furthermore, the individual fibrids, regardless of size, appear to be non-rigid, i.e., they curl, curve, and bend in snake-like fashion rather than with sharp angular breaks. The structures are frequently frazzled. These particles are readily suspended in liquids. Due to their morphology, their drainage characteristics from aqueous suspensions, as expressed in freeness numbers, and the minimum wet strength tenacity of their waterleaves, they are suitable for the making of sheet-like products upon conventional paper-making equipment.

SOFT FIBRID PRODUCTION

Soft fibrids are produced by dispersing a solution of a soft synthetic polymer in a non-solvent for the said polymer (referred to hereinafter as a precipitant) under conditions such that the precipitation number (the "P" value) of the system, as defined hereinafter, is within the limits of from about 10 to about 10,000.

PRECIPITATION NUMBER

The formation of the fibrids of the present invention is governed by such variables as the viscosity of the solution and precipitant, the power of the solvent, the rate at which the polymer is precipitated, and the extent of the shearing force, particularly the extent of the effective shearing force (i.e., the amount of shear to which the precipitating polymer is subjected). It has been found that these variables in large measure may be expressed in terms of a "precipitation number" designated "P" hereinafter and defined by the expression:

$$P=\frac{V_p}{V_s}Q$$

wherein $V_p$ is the viscosity of the precipitant and $V_s$ is the viscosity of the polymer solution, both measured at the temperature of precipitation, and Q is an agitation factor which may be expressed in terms of the rate in revolutions per minute at which the agitating device in the precipitant is rotated.

As an example of the physical significance of these "P" values, a P number of 300,000 corresponds to rapid stirring of a low viscosity polymer solution in a very viscous precipitant. The high shear encountered by the precipitating polymer under these conditions results in the formation of a dispersion of fine particles, e.g., they are not retained by a 200-mesh screen. As another example, P values as low as 0.14 correspond to conditions where a viscous polymer solution is added to a fluid precipitant. Under these conditions not enough force is applied to disperse the polymer solutions before a skin forms. This results in the formation of lumps. In the past the usual objective in separating polymers from solution has been to precipitate them in a readily filterable, easily washable form. Formation of this type of precipitate generally requires the use of relatively slow stirring speeds and rather low viscosity precipitants. These conditions correspond to P values below about 1. As will be apparent from a consideration of the formula defining P, the value is directly proportional to both the viscosity of the precipitant and the amount of agitation and inversely proportional to the viscosity of the polymer solution. Thus, the degree of agitation can be reduced, provided the viscosity of the precipitant is adequately increased and/or the viscosity of the polymer solution reduced.

IDENTIFICATION OF FIGURES

The invention will be more readily understood by reference to the illustrations.

The drawing is the fibrid of Example 2 (magnification of about 300 times).

DEFINITIONS AND STANDARDS

The strength of hand sheets prepared from "soft" polymers is determined by depositing a slurry of fibrids containing a nonionic wetting agent on a 100-mesh screen, washing the sheets obtained with approximately 6 liters of water and immediately rolling them off the screen by the couching technique familiar to the paper industry.

Strips one-half inch wide are then quickly cut from the sheets and tested immediately while wet on an Instron tester. The sheets are then dried thoroughly at room temperature, reweighed, and the wet strength originally measured calculated on a dry basis. The remainder of the sheet is dried at 120° C. (or, if necessary, at a temperature below the fusion temperature of the polymer), for two hours. After cooling, one-half inch strips are cut from the sheet and dry tensile strength measured on an Instron tester.

Freeness is determined by Tappi test T227m50. The data obtained from this test are expressed as the familiar Canadian standard freeness numbers, which represent the number of ml. of water which drain from the slurry under specified conditions.

Elmendorf tear strength is measured on the Elmendorf tear tester according to the procedure described in Tappi test T414m49. The strength recorded is the number of grams of force required to propagate a tear the remaining distance across a 63 mm. strip in which a 20 mm. standard cut has been made.

Tear factor is calculated by dividing the Elmendorf tear strength in grams by the basis weight in g./m.$^2$.

Tongue tear strength is determined in accordance with ASTM D-39.

Burst strength is measured on the Mullen burst tester according to the procedure described in Tappi test T40m53.

Fold endurance is determined by Tappi test T423m50, using the MIT Folding Endurance tester.

Elastic recovery is the percentage returned to original length within one minute after the tension has been relaxed from a sample which has been elongated 50% at the rate of 100% per minute and held at 50% elongation for one minute.

Stress decay is the percent loss in stress in a yarn one minute after it has been elongated to 50% at the rate of 100% per minute.

Initial modulus is determined by measuring the initial slope of the stress-strain curve.

The following examples are cited to illustrate the invention. They are not intended to limit it in any manner.

Example 1

A segmented elastomer is prepared by condensing 124.5 grams (0.12 mol) poly(tetramethylene oxide) glycol having a molecular weight of about 1000 and 10.50 grams (0.06 mol) of 4-methyl-m-phenylene diisocyanate with stirring in an anhydrous atmosphere for 3 hours at steam bath temperatures. 30.0 grams (0.12 mol) of methylene bis(4-phenyl isocyanate) dissolved in dry methylene dichloride is added to the hydroxyl-terminated intermediate and the mixture is stirred for 1 hour on a steam bath to produce an isocyanate-terminated derivative which, after cooling, is dissolved in 400 grams of N,N-dimethylformamide. A polymer solution containing about 28% solids is formed on addition of 3.0 grams (0.06 mol) of hydrazine hydrate dissolved in 26 grams of N,N-dimethylformamide.

The polymer solution produced as described above is diluted to an approximately 10% solids content and 50 grams is added to approximately 300 ml. of glycerol in a one-quart Waring Blendor operating at 14,000 r.p.m. The fibrids obtained are deposited on a 100-mesh screen to form a sheet with good drape, hand, and liveliness. After drying for about 2 hours in an air oven at 80° C., this sheet has a tensile strength of 0.04 g.p.d., an Elmendorf tear strength of 448 grams, a basis weight of 227 grams/m.$^2$, a tear factor of 2.0 and a burst strength of 11 p.s.i.

Fibrids can be prepared from this condensation elastomer using other precipitating media, such as water, N,N-dimethylformamide/water mixtures, concentrated calcium chloride solutions, acetone, etc. However, glycerol and ethylene glycol or their aqueous solutions are preferred precipitating media.

Under the proper conditions, fibrids can be formed into a sheet with the same surface pattern as that of the screen on which they have been deposited. For example, a sheet with a pattern resembling that of a plain weave fabric is obtained by depositing the fibrids on a 100-mesh screen in the usual manner.

Example 2

9 grams of the condensation elastomer of Example 1 and 1 gram of polyacrylonitrile are dissolved in N,N-dimethylformamide to produce a solution containing approximately 10% solids. This solution is added to 300 ml. of glycerol maintained at 45° C. in a 1 quart Waring Blendor operating at approximately 14,000 r.p.m. The fibrids obtained, shown in FIGURE 1, are deposited on a screen to produce a non-woven fabric with a dry tenacity of 0.05 g.p.d., a rewet tenacity of 0.03 g.p.d., an Elmendorf tear strength of 672 grams, a tongue tear strength of 244 grams, a basis weight of 254 grams/m.$^2$, and an Elmendorf tear factor of 2.7.

A gray-green product is obtained by the addition of 1.6% of a black polymeric dye to the polymer solution prior to precipitation. The dyed product is sewed to a lining made from "Orlon" (Du Pont's acrylic fiber) and used to prepare a lady's vest which has the appearance of a suede vest.

Example 3

The addition of the polyacrylonitrile fibrids demonstrated in the preceding example improves the tear strength of the non-woven fabric and modifies the hand appreciably. As the amount of polyacrylonitrile is increased, the hand changes from soft and drapable, like a soft suede leather, to a structure which approaches a feel of harder leather such as a shoe upper. The sheets which contain approximately 30% of polyacrylonitrile resemble shoe upper leather very closely. The sheet is prepared following the procedure of the previous example except that the polymer solution contains 56 grams of the condensation elastomer and 24 grams of polyacrylonitrile diluted to 10% with N,N-dimethylformamide and the precipitation is performed at room temperature. The fibrids formed in this solvent-precipitant mixture are deposited on a 100-mesh screen, washed with approximately 20 liters of water, dried at room temperature, and then in an oven at 120° C. The dry sheet has a tenacity of 0.03 g.p.d., an Elmendorf tear strength of 128 grams, an elongation of 16%, an initial modulus of 0.5 g.p.d., and a thickness of 24 mils.

Examples 4 to 14, reported below are repetitions of the above using various polymer proportions as indicated.

TABLE I

| Ex. | Composition: Elastomer/ Polyacrylonitrile | Tenacity, g.p.d. | Percent Elongation | Initial Modulus [1] | Elmendorf tear strength [2] | Thickness, mils |
|---|---|---|---|---|---|---|
| 4 | 100/0 | 0.01 | 97 | 0.01 | 128 | 14 |
| 5 | 90/10 | 0.03 | 99 | 0.17 | 256 | 13 |
| 6 | 80/20 | 0.02 | 50 | 0.07 | 384 | 26 |
| 7 | 70/30 | 0.03 | 16 | 0.50 | 128 | 24 |
| 8 | 60/40 | 0.03 | 60 | 0.32 | 320 | 19 |
| 9 | 50/50 | 0.03 | 13 | 0.60 | 128 | 32 |
| 10 | 40/60 | 0.05 | 9.6 | 1.40 | 96 | 28 |
| 11 | 30/70 | 0.10 | 14 | 1.9 | 96 | 38 |
| 12 | 20/80 | 0.01 | 4.0 | 0.35 | 32 | 51 |
| 13 | 10/90 | 0.01 | 4.6 | 0.30 | 96 | 54 |
| 14 | 0/100 | 0.01 | 4.4 | 0.28 | 32 | 69 |

[1] G.p.d.
[2] Grams.

Example 15

A wide variety of products can be prepared by blending together the fibrids produced from "hard" and "soft" polymers. The preceding examples showed the formation of blends obtained by precipitating a single solution containing both types of polymers. Bulkier structures are obtained by precipitating separate solutions of the two polymers in a precipitant and blending the slurries.

For example, 72 grams of the condensation elastomer of Example 1 as a 10% solution in N,N-dimethylformamide is precipitated in glycerol as taught in the previous examples. In a separate preparation 8 grams of polyacrylonitrile as a 10% solution in N,N-dimethylformamide is similarly precipitated in glycerol. The two dispersions of fibrids in N,N-dimethylformamide/glycerol mixtures are then added to approximately 4 liters of water containing 10 ml. of Tergitol, stirred for about 2½ minutes, and deposited on a 100-mesh screen. The sheet obtained has a dry tenacity of 0.02 g.p.d., a basis weight of 179 grams/m.², an Elmendorf tear strength of 192 grams, and a tear factor of 1.07.

A great variety of sheets with modified hand and tensile properties may be obtained by blending various proportions of fibrid slurries produced from "hard" and "soft" polymer. Data for sheet products produced by the process of this example are given in the following table, the composition variations being noted.

TABLE II

| Ex. | Composition: Elastomer/ Polyacrylonitrile | Tenacity [1] | Percent Elongation | Initial Modulus [1] | Elmendorf tear strength [2] | Basis Weight [3] |
| --- | --- | --- | --- | --- | --- | --- |
| 16 | 90/10 | 0.02 | 45 | 0.13 | 192 | 179 |
| 17 | 80/20 | 0.03 | 17 | 0.49 | 160 | 176 |
| 18 | 70/30 | 0.03 | 12 | 0.55 | 96 | 285 |
| 19 | 60/40 | 0.02 | 10.4 | 0.50 | | 314 |
| 20 | 50/50 | 0.01 | 7.8 | 0.49 | 64 | 400 |
| 21 | 40/60 | 0.01 | 11 | 0.20 | 256 | 610 |
| 22 | 30/70 | 0.14 | 11 | 3.20 | 96 | 201 |
| 23 | 20/80 | 0.11 | 13 | 3.20 | 128 | 269 |
| 24 | 10/90 | 0.10 | 8.1 | 4.20 | 128 | 191 |

[1] G.p.d.
[2] Grams.
[3] G./m.².

"SOFT" POLYMERS

Representative "soft" polymers are the plasticized vinyl polymers and the condensation elastomers. The plasticized vinyl polymers are prepared by mixing any suitable plasticizer with a compatible vinyl polymer. The ester type of plasticizer has been found to be quite satisfactory. Plasticized vinyl chloride polymers, including copolymers with vinyl acetate and vinylidene chloride, have been found to be particularly suitable. Fibrids may be made from suitable uncured rubbers, by the methods applicable to the tacky hard polymers. The properties may then be modified by certain curing procedures.

A wide variety of low modulus condensation elastomers are available for preparing fibrids. A condensation elastomer will usually form shaped articles having a tensile recovery above about 75% and a stress decay below about 35%.

Segmented condensation elastomers are prepared by starting with a low molecular weight polymer (i.e., one having a molecular weight in the range from about 700 to about 2500), preferably a difunctional polymer with terminal groups containing active hydrogen, and reacting it with a small coreactive molecule under conditions such that a new difunctional intermediate is obtained with terminal groups capable of reacting with active hydrogen. These intermediates are then coupled or chain-extended by reacting with compounds containing active hydrogen. Numerous patents have been issued in which the low molecular weight starting polymer is a polyester or polyesteramide and the coreactive small molecule is a diisocyanate. A large variety of coreactive active hydrogen compounds is suggested in these patents for preparing the segmented condensation elastomers. Among the most practical chain-extending agents are water, diamines, and dibasic acid.

U.S. 2,692,873 describes similar products in which the starting polyesters have been replaced by polyethers of a corresponding molecular weight range. More recent developments have shown that a number of suitable macromolecular compounds, such as polyhydrocarbons, polyamides, polyurethanes etc., with suitable molecular weights, melting point characteristics, and terminal groups, can serve as the starting point for preparing segmented elastomers of this type. It has also been found possible to replace the diisocyanate with other difunctional compounds, such as diacid halides, which are capable of reacting with active hydrogen. In addition elastic copolyetheresters are obtained by condensation of a polyether glycol, an aliphatic glycol, and an aromatic dibasic acid or suitable derivative.

Other types of condensation elastomers are also suitable. U.S. 2,670,267 describes N-alkyl-substituted copolyamides which are highly elastic and have a suitable low modulus. A copolyamide of this type, obtained by reacting adipic acid with a mixture of hexamethylenediamine, N-isobutylhexamethylenediamine, and N,N'-isobutylhexamethylenediamine produces an elastomer which is particularly satisfactory for the purposes of this invention. U.S. 2,623,033 describes linear elastic copolyesters prepared by reacting glycol with a mixture of aromatic and acyclic dicarboxylic acids. Copolymers prepared from ethylene glycol, terephthalic acid, and sebacic acid have been found to be particularly useful. Another class of condensation elastomers is described in U.S. 2,430,860. The elastic polyamides of this type are produced by reacting polycarbonamides with formaldehyde.

POLYMER SOLUTIONS

Useful solvents or solvent mixtures for preparing solutions to be used in the direct preparation of fibrids by the one-step "shear precipitation" process of this invention should dissolve at least about 5% by weight of the polymer, copolymer, or polymer mixture. When solutions containing concentrations below this level are used, the fibrids obtained on precipitating the polymer tend to be too fine and too small to be useful in such applications as the preparation of sheet products. A practical upper limit to solution concentration is approximately 30%. Above this level the solution viscosity becomes so high that it is difficult to disperse the solution into the precipitant and obtain a satisfactory fibrids product. The preferred concentration range is about 15%. The concentration of polymers is usually adjusted to provide a solution with a viscosity between about 100 and about 10,000 centipoises.

POLYMER SOLVENTS

A large variety of organic liquids is suitable for preparing these solutions. The particular solvent chosen will depend upon toxicity, cost, the polymer being used, type of fibrid desired, and the like. As is usual, the best balance between cost and optimum product will be selected. The solvents which have been found most widely useful are polar solvents, such as N,N-dimethylformamide, N,N-dimethylacetamide, M-cresol, formic acid, and sulfuric acid. Plasticized vinyl polymers are frequently soluble in common organic solvents, such as acetone, chloroform, and mixtures of chloroform with alcohols, such as methanol. Another useful group of liquids includes those which dissolve the polymer at high temperatures but which are non-solvents at temperatures in the neighborhood of room temperature. Thus it is possible to use these liquids as both solvents and precipitants by controlling the temperature.

POLYMER PRECIPITANTS

A liquid is suitable as a precipitant if it dissolves no more than about 3% by weight of the polymer. It is preferable, but not absolutely essential, that the precipitant be miscible with the polymer solvents in the proportions used. Some degree of miscibility is, of course essential. Suitable precipitants are water, glycerin, ethylene glycol, ether, carbon tetrachloride, acetone/hexane and dioxan/hexane mixtures, triethanolamine, etc. Water-miscible precipitants are preferred and aqueous organic mixtures, particularly water-glycerol mixtures, are an important group of precipitants. Glycerol alone or aqueous solutions containing small amounts (i.e., up to about 20%) of water have been found to be the best precipitants for the condensation elastomers. Mixtures of solvents and precipitants, such as dilute aqueous solutions of the solvent, have also been found to be useful. Water alone is particularly desirable for economic reasons and it can be used as a precipitant, particularly when a thickener, such as sodium carboxymethylcellulose, has been added.

The viscosity of the precipitating medium may be controlled over a wide range by changing the temperature or by the use of additives, including thickeners such as poly(vinyl alchohol). Precipitants are operable over a wide range of viscosities, e.g., from about 1 to about 1500 centipoises. The effectiveness of the shearing action provided by the stirrer is enhanced by decreasing the viscosity of the solution and/or increasing the viscosity of the precipitant. Relatively viscous precipitating media are preferred.

ADDITIVES

Either the precipitant or the solution, or both, may contain additives for modifying the types of slurries and/or the nature of the sheet products obtained. Thus, the precipitant and/or the solution may contain fibrids from the same or different polymers. The precipitant and/or the solution may also contain, in place of, or, in addition to, the fibrids claimed herein, synthetic and/or natural staple fibers, such as those from nylon, poly(ethylene terephthalate), or polyacrylonitrile, staple fibers from cellulose, glass fibers, asbestos, etc. The precipitant and/or the solution may also contain dyes, antistatic agents, surfactants, fillers, such as silica, or titanium dioxide, pigments, antioxidants, etc. The addition of these substances to the polymer solution prior to precipitation can produce a marked increase in the tensile strength, tear strength, and tear factor of sheets prepared from the fibrids, when compared to the unmodified sheets. Very interesting and different products may also be obtained by dissolving a mixture of polymers and co-precipitating them.

PRECIPITATION NUMBERS

Soft fibrids are prepared by precipitating polymers from solution in a shear zone, so that the precipitating polymer particles are subjected to relatively large shearing forces while they are in a plastic, deformable state. The variables are controlled to operate within the defined limits of P. The three variables which appear to play a major role in controlling the nature of the product are: (1) the shearing stress, $S_p$, supplied to the solution by the precipitant as it enters the shear zone, (2) the rate of stretching, $R_s$, of the polymer solution as it is converted to an elongated article, which depends upon, among other things, the solution viscosity, $V_s$, (3) the length of time, $t$, that the solution is in a deformable state (i.e., prior to complete precipitation). The following discussion provides a semiquantitative measurement based on the interaction of these variables.

The rate of shear, R, is proportional to the shearing stress, S. Introducing the viscosity, V, as a proportionality constant, the equation becomes $$S = VR$$

Using the subscript $s$ for the solution and the subscript $p$ for the precipitant, the shearing stress applied to the polymer solution by the precipitant is given by the equation $$S_p = V_p R_p \quad (1)$$

The rate of shear in the polymer solution is determined from the relationship $$R_s = \frac{S_p}{V_s} \quad (2)$$

Combining these two equations gives $$R_s = \frac{V_p}{V_s} R_p \quad (3)$$

The type of fiber products formed will depend on $t$, the time interval during which the precipitate is deformable. The product $R_s t$ will be designated P (the precipitation number), which is determined by the following relationship $$P' = \frac{V_p}{V_s} R_p t \quad (4)$$

Equation 4 may be simplified by substituting Q, the stirring speed in r.p.m., for $R_p$, the rate of shear in the precipitant. Thus, Equation 4 becomes $$P' = \frac{V_p}{V_s} Q t \quad (5)$$

The value of $t$ is determined as described in the following section. However, because of the scarcity of data available, the P values reported previously were calculated by assigning to $t$ a value of unity. For simplicity, the proportionality factor required to make the equation dimensionally correct was ignored and the P values considered to be dimensionless. Thus, the equation actually used was $$P = \frac{V_p}{V_s} Q \quad (6)$$

The value of $t$ is determined by a test in which the liquid proposed for use as a precipitant is added from a burette to the stirred polymer solution from which it is intended to produce fibrids. The volume percent of precipitant present in the solvent/precipitant mixture when a permanent precipitate is first formed is designated as X. X is related to $t$ by the equation $$X = 50\left[1 - \psi\left(\frac{y}{2\sqrt{Dt}}\right)\right]$$

in which $$\psi = \left[2/\sqrt{\pi} \int_0^{\left(\frac{y}{2\sqrt{Dt}}\right)} \right] e^{-y^2} dy$$

In the formulas D is the diffusion coefficient. Diffusion is the rate process on which the formation of fibrids is dependent. Thus, $t$ represents the characteristic time required in a given system for the precipitant concentration to build up to the value of X at some specified distance inward from the polymer droplet. A value of $10^{-5}$ cm.$^2$/sec. has been assigned to D. Taking the average dimension of fibrids into consideration, the distance, y, which the precipitant must difuse in the time, $t$, has been set at 0.1 micron. It is assumed that precipitation will occur instantly when the concentration, X, is reached.

Values of $t$ in microseconds (0.000001 second) are selected in the range 1 to 1000. The corresponding values of X are then calculated with the aid of the Table of Integrals in Lange's Handbook, using the formulas given above. These values are then plotted. The value of X is determined for a particular system by titration. The value of $t$ is then determined from the curve plotted from the previous calculation of the relationship between X and $t$.

The value of X is specific for a given polymer concentration in a specific solvent and utilizing a particular precipitant. Once the solvent and precipitant have been selected, the only variable for a given polymer is polymer concentration. Fortunately, the value of X changes very little with polymer concentration for the preferred precipitants of this invention. This means that the value for $t$ is substantially independent of concentration for the system. The relationship between $t$ and the polymer concentration can be readily determined and the $t$ values picked from a graph of this relationship. Fortunately, the value of $t$ is a constant for a specific system.

As X approaches 50 the value of $t$ approaches infinity. Since an infinite time is required to produce a precipitate, it is impossible to produce fibrids from this system. The value of $t$ can be reduced in two ways for those systems where the solvent-precipitant mixture still has appreciable solvent power. One of these is to increase the polymer concentration in the solution. This permits the formation of a precipitate in a shorter period of time. Similar results can be achieved by mixing precipitants with the solution prior to starting precipitation.

The table below shows values of X and $t$ for the solutions of the elastomer of Example 1 using a variety of precipitants. It shows why acetone is not a good precipitant despite the fact that it is a poor solvent for the polymer.

TABLE III

*Elastomer*

[Example 1 in DMF]

| X | $t$ |
|---|---|
| 3 | 1.4 |
| 4.5 | 1.95 |
| (¹)(35–60) | (34–∞) |
| 28 | 15 |

¹ X=35 for 10% solution
  =60 for 20% solution.

NOTES:
X is in volume percent ppt. in final mixture.
$t$ is in microseconds.
Values of X and $t$ in parentheses are given where X depends significantly on concentration.

The preferred fibrids obtained from "soft" polymers are precipitated from solution under conditions such that the P values are between about 10 and 10,000, particularly between the limits of 40 and 7,000.

The sheet-forming fibrids desired are generally not obtained at very low solution viscosities (i.e., below about 0.3 poise), where the rate of precipitation is so slow that the stirring disperses the solutions to form fine particles. Furthermore, fibrids are not obtained directly at very low stirring rates, e.g., of the order of 100–500 r.p.m. These rates correspond to Reynold's numbers for the stirred precipitants of the order of 10, which is far below that required for turbulent mixing, and is in a range where efficiency is very poor. When these low stirring rates are used with viscous precipitants, the polymer solution tends to wrap around the stirrer and form a mass which rotates with the stirrer.

It is quite evident that the P value is very useful when working with a given polymer-solvent precipitant combination. For example, if the particles obtained from a given combination of $V_p$, $V_s$ and Q are too fine, it is clear that P must be reduced. This may be accomplished by increasing $V_s$ (e.g., by increasing the solution concentration), by decreasing the rate of stirring, or by decreasing the precipitant viscosity (e.g., by dilution with a suitable liquid of lower viscosity).

Suitable fibrid products are obtained by operating a stirrer at about 500 to about 15,000 r.p.m., while mixing 300 ml. of precipitant at a temperature between about 20° and 60° C. with 20 to 100 grams of the polymer solution. This solution should have a viscosity above about 100 centipoises at room temperature and be at a temperature between about 15° and 35° C. when added to the precipitant. The practical upper limit for solution viscosity is about 15,000 centipoises for soft polymer fibrids. In certain instances higher temperatures can be used for the solution and/or the precipitant than have been specified in this paragraph.

PRECIPITATING EQUIPMENT

Shearing action is dependent to some extent upon the design of the stirrer and the vessel in which precipitation occurs. Suitable shearing action for preparing the fibrids of this invention may be obtained by the use of a stirrer having the stirrer paddle or blade at an angle to the plane of rotation of the paddle or blade. The design of the stirrer blade used in the Waring Blendor has been found to be particularly satisfactory. Turbulence can be increased by introducing suitable baffles in the mixing vessel. This design is used in the commercial devices of the Waring Blendor type. The results indicate that fibrids with a particularly desirable morphology are obtained when precipitation occurs in a shear zone which is also turbulent. The combination of stirrer action and container design generally used in the practice of this invention produces precipitating conditions which combine turbulence with adequate shear.

Other types of apparatus may also be used provided they may be adapted to provide sufficient shear and turbulence. For example, certain solutions may be jetted into suitable precipitants to produce satisfactory fibrids. Other modifications may be devised by those skilled in the mixing art.

FREENESS NUMBERS

The freeness numbers of aqueous slurries of the soft polymer fibrids of the present invention are below about 750 and the preferred products have freeness numbers in the range between 400 and 700.

The freeness and many other characteristics of these slurries of soft fibrids are similar to those of cellulose pulps used for making paper. The primary distinction is that the slurries are prepared from synthetic polymers. Accordingly, they may be thought of as synthetic "pulps." The properties of fibrid slurries may be modified by mixing with them a slurry of fibrids from other polymers and/or mixing with synthetic fiber staple, or chopped synthetic fibers, or staple from cellulose or cellulose derivatives and/or beaten cellulose, and/or natural animal fibers and/or mineral fibers.

FIBRID SHEETS

An important characteristic of soft fibrids is their cohesiveness or bonding strength in sheet products. This is quite evident in both wet and dry sheets. Homosheets prepared from soft polymer fibrids have a minimum wet strength of approximately 0.001 g.p.d. and a minimum dry strength before pressing of approximately 0.005 g.p.d. A characteristic of these sheets which distinguishes them from homosheet products prepared from hard polymer fibrids is the behavior on rewetting after drying. The sheets from soft polymer fibrids retain a substantial percentage of the dry strength whereas unpressed, unfused homosheets prepared from hard polymer fibrids drop back more nearly to a strength level of the original wet sheet, a value which is appreciably lower than the dry strength. The wet tenacity of sheets prepared from staple fibers is usually less than $4 \times 10^{-4}$ gram/denier. Furthermore, when once formed into sheets, soft fibrids resist subsequent attempts to redisperse them. Values expressed as grams/denier may be converted to values expressed as lbs./in./oz./yd.² by multiplying by 17.

By virtue of their special characteristics fibrids disperse readily to form stable dispersions which may be used in ordinary paper-making operations without adding surfactants. This permits use of these fibrids in paper-making machinery without modification of the usual processing conditions and serves to distinguish fibrids from any previously known fiber form of synthetic polymer. Thus, fibrids may be added to the beater and passed through the refiner into the head box onto the screen of a Fourdrinier machine. From there the sheet may be carried to the wet press through dryer rolls, calenders, and wound up as a sheet without modifying the normal operating characteristics of the machines for making cellulose paper.

An important feature of the bonding properties of fibrids is that no heat or pressure is required to develop adequate strength. The geometry of the sheet is determined primarily by the form in which it is held while being dried at room temperature. The strength of sheet products comprising soft polymer fibrids can be increased by heating alone. Pressure rolls and solvent treatments, applied as known in the art generally tend to produce denser, stiffer, less porous sheets.

In the preparation of sheet products from soft polymer fibrids, the rate of deposition of the fibrids from their slurry must be considered, since this affects the density of the sheets. Thus, if the rate is very slow, a fluffy mass of loosely-packed fibrids is formed, which has a characteristic open spongy structure with a bulk density of approximately 0.2 lb./cu. ft. However, by applying full vacuum and depositing the fibrids more rapidly, considerably denser sheets (e.g., up to 8 lbs./cu. ft.) are formed. Another feature of these fibrids is that they take up the pattern of the screen or fabric on which they are deposited. This permits the formation of a variety of patterns and weave-like finishes on surface of the sheets produced. For example, by using an 80-mesh twill screen, a basket weave is imprinted on the surface of the sheet. similar effects are observed when fibrids are deposited on woven glass fabrics or woven synthetic fiber fabrics, such as nylon tricot. In this latter application the fibrids bond themselves to the fabrics so strongly that delamination is difficult and reinforced layered structures can be obtained. The tear strength of the tricot-backed structure is equal to that of army duck.

FIBRID BONDED PRODUCTS

The hand and other properties of sheet products prepared from soft fibrids can be controlled and modified in many ways. One of the preferred methods for accomplishing this is to blend the fibrids of this invention with staple fibers. These staple fibers may be derived from cellulosic materials, staple of synthetic polymers, or staple fibers of natural origin. The combination of the fibrids with staple generally results in a sheet with higher tear strength. Within this area the properties can be controlled or modified by the choice of polymer for preparing the fibrids, the choice of staple fiber, composition and/or length and/or denier. The properties of heterosheets, i.e., sheets from mixtures of fibrids and staple, particularly surface properties, may be controlled by the amount and type (dead load or calender) of pressure applied, calendering temperature, and the like. For example, waterleaves may be prepared from a properly selected combination of fibrids and staple which may be dried and pressed at suitable pressures and temperatures to fuse the fibrids, but not the staple, to produce a fiber-reinforced plastic sheet. Other sheet properties, such as absorbency, appearance, reflectance, color, surface smoothness, etc., can be modified by the use of fillers, sizes, dyes, wetting agents, etc.

The porous sheets obtained by depositing soft polymer fibrids on a screen have a fabric-like drape and a pleasing soft hand similar to that of suede leather or chamois. The porosity of the sheet and the surface characteristics due to projecting fiber ends avoid the cold disagreeable feel associated with rubber sheets. Blending fibrids with staple fibers results in the formation of a sheet which resembles leather in its tacticle and tensile properties. This is particularly true when staple from hard polymers, such as nylon, polyacrylonitrile, and poly(ethylene terephthalate), are used. Use of increasing percentages of these staple fibers tends to produce stiffer sheets. The sheet properties can also be modified by adding hard polymer fibrids. Addition of these fibrids also tends to produce sheet products with leather-like properties, but they are more supple than those obtained by blending with staple.

Sheet properties, particularly absorbency, appearance, reflectance, color, surface smoothness, etc., can be modified by the use of fillers, sizes, dyes, wetting agents, etc. An appreciable increase in strength of sheets from soft polymer fibrids has been realized by adding silica.

Some of the many uses of fibrids have been pointed out, particularly their use on ordinary paper-making machinery.

As pointed out above, they may be fabricated into more rigid structures, such as leather-like materials, by blending with staple fibers. In addition, soft and hard polymer fibrids can be blended, the soft polymer fibrids serving the primary purpose of bonding agents, but also contributing to the surface characteristics and suppleness of the products. One of the interesting non-woven structures which can be obtained is the flannel to felt-like products produced by blending soft polymer fibrids with crimped staple from nylon, poly(ethylene terephthalate), polyacrylonitrile, and the like.

There are many applications other than those in sheet products, however, for example, they may be used as surface modifiers, i.e., modifiers of feel or hand in layered structures. They may be used as ion exchange materials, in greases, and as reinforcing agents for plastics, paint films, oils, caulking compounds, plaster, plaster board, etc. They may also be used as raw materials for compression molding to give molded objects with unusual properties.

Many equivalent modifications will be apparent to those skilled in the art from a reading of the above without a departure from the inventive concept.

What is claimed is:

1. A supple sheet product having a dry, warm feel with tactile properties otherwise resembling a skin-derived pellicle consisting essentially of (a) a first variety of at least 10% of supple, wholly synthetic polymeric particles being non-rigid and non-granular in nature, and being capable of forming an aqueous slurry having a freeness number of between 100 and 750, the polymer of the said particles being characterized by an initial modulus less than about 0.1 gram per denier, the said particles being engaged in contiguous continuity by mutual physical entwinement of abutting particles; the said particles being further characterized by an ability when deposited upon a screen from an aqueous suspension to form a couched wet waterleaf having a wet tenacity of at least about 0.001 gram per denier, the said wet waterleaf forming on drying without pressing a dry waterleaf having a dry tenacity of at least about 0.005 gram per denier, the said dry waterleaf retaining a substantial percentage of its dry strength upon rewetting and (b) a second variety of the said supple, wholly synthetic polymeric particles, the polymer of the said particles being characterized by an initial modulus of at least about 0.9, the said particles being otherwise as characterized in (a) above except in their ability to form a dry waterleaf which will retain a substantial percentage of its dry strength upon rewetting.

2. The sheet product of claim 1 wherein the said first variety of polymeric particles are formed from a plasticized vinyl.

3. The sheet product of claim 1 wherein the second variety of polymeric particles are formed from polyacrylonitrile.

4. The sheet product of claim 1 wherein the said first variety of polymeric particles are formed from a condensation elastomer.

5. The sheet product of claim 4 wherein the second variety of polymeric particles are formed from polyacrylonitrile.

References Cited in the file of this patent

UNITED STATES PATENTS

| Number | Name | Date |
|---|---|---|
| 2,252,557 | Czerwin | Aug. 12, 1941 |
| 2,342,387 | Catlin | Feb. 22, 1944 |
| 2,374,576 | Burbaker | Apr. 24, 1945 |
| 2,626,214 | Osborne | Jan. 20, 1953 |
| 2,692,873 | Langerak et al. | Oct. 26, 1954 |
| 2,794,010 | Jackson | May 27, 1957 |
| 2,806,256 | Smith-Johannsen | Sept. 17, 1957 |
| 2,810,646 | Wooding et al. | Oct. 22, 1957 |

FOREIGN PATENTS

| 614,063 | Great Britain | Dec. 8, 1948 |